(12) United States Patent
Maurer et al.

(10) Patent No.: US 11,618,115 B2
(45) Date of Patent: Apr. 4, 2023

(54) ZERO-POINT CLAMPING DEVICE

(71) Applicant: SMW-Autoblok Spannsysteme GmbH, Meckenbeuren (DE)

(72) Inventors: Eckhard Maurer, Oberteuringen (DE); Juergen Marquart, Markdorf (DE)

(73) Assignee: SMW-Autoblok Spannsysteme GmbH

( * ) Notice: Subject to any disclaimer, the term of this patent is extended or adjusted under 35 U.S.C. 154(b) by 295 days.

(21) Appl. No.: 16/992,588

(22) Filed: Aug. 13, 2020

(65) Prior Publication Data

US 2021/0046594 A1 Feb. 18, 2021

(30) Foreign Application Priority Data

Aug. 14, 2019 (EP) ..................................... 19191662

(51) Int. Cl.
*B23Q 1/00* (2006.01)
*B23B 31/16* (2006.01)

(52) U.S. Cl.
CPC ............ *B23Q 1/0072* (2013.01); *B23B 31/16* (2013.01)

(58) Field of Classification Search
CPC ................ B23Q 1/0072; B23B 31/107; B23B 31/10741; B23B 31/1078; B23B 31/16004; B23B 31/16; B23B 31/12; B23B 31/10; B23B 2260/056; Y10T 279/17675
See application file for complete search history.

(56) References Cited

U.S. PATENT DOCUMENTS

| 226,246 | A | * | 4/1880 | Reid | ................. | B23B 31/16045 |
| | | | | | | 279/67 |
| 9,156,092 | B2 | * | 10/2015 | Karlein | ............. | B23B 31/16045 |
| 11,235,430 | B2 | * | 2/2022 | Schanz | ............... | B23B 31/1078 |

FOREIGN PATENT DOCUMENTS

| DE | 328184 C | * | 10/1920 | | |
| DE | 102013218050 A1 | * | 3/2015 | ........... | B23Q 1/0072 |
| DE | 102010010898 C5 | * | 4/2017 | ....... | B23B 31/16004 |
| DE | 102016109195 A1 | * | 11/2017 | ........... | B23Q 1/0072 |
| EP | 1886751 A2 | * | 2/2008 | ........... | B23B 31/001 |

OTHER PUBLICATIONS

Machine Translation, Description DE102010010898C5. (Year: 2017).*

* cited by examiner

*Primary Examiner* — Boyer D Ashley
*Assistant Examiner* — Reinaldo A Vargas Del Rio
(74) *Attorney, Agent, or Firm* — Pandiscio & Pandiscio (57) ABSTRACT

A zero-point clamping device for centered locking of an object with repeat accuracy, the device comprising: a housing, a receiving opening worked into the housing having a centering axis, at least two clamping slides mounted axially displaceably in a bore provided in the housing, and an actuating element for moving the clamping slides, one axis of rotation of the actuating element running tangentially and at a distance from the receiving opening to enable a reliable, permanent and repeatable fixing of a large number of workpieces and being extremely compact. This is achieved with two spaced-apart threads incorporated in the actuating element, the respective threads of which have identical pitches and are inclined in opposite directions, and a drive pin inserted in each thread in a driving connection with the thread such that the drive pins can be moved along the axis of rotation of the actuating element.

14 Claims, 7 Drawing Sheets

ZERO-POINT CLAMPING DEVICE

REFERENCE TO PENDING PRIOR PATENT APPLICATION

This patent application claims benefit of European Patent Application No. 19 191 662.6, filed Aug. 14, 2019, which patent application is hereby incorporated herein by reference.

FIELD OF THE INVENTION

The invention relates to a zero-point clamping device according to the pre-characterising clause of Patent Claim 1, by which an object is centred and fixed in space with high repeatability.

BACKGROUND OF THE INVENTION

Clamping devices are required on machine tools to support objects to be machined, in particular rotationally symmetrical or cubic workpieces, because these workpieces are to be machined in series and can therefore be exchanged without loss of time. The specified machining position of the workpiece with respect to a reference value, which is defined as the so-called zero point, should be maintained in order to avoid the need to measure the workpiece position again. Accordingly, the zero point is defined in relation to the machine tool or its tool table and the spatial position of the clamped workpiece is determined for this point. The zero point therefore serves as a reference value for the machining position of the workpiece. When exchanging the workpieces, there should therefore be an identical distance to the specified reference value (zero point).

Such a zero-point clamping device can be found, for example, in EP 1 886 751 B1. The clamping device consists of a housing in which a receiving opening is incorporated. A retaining bolt or a carrier part can be inserted into the receiving opening, which is fixed by means of clamping slides arranged laterally in the housing. The clamping slides are arranged perpendicular to the centring axis of the retaining bolt and thus move in a radial direction into the interior of the receiving opening and outwards to release it. The clamping slides come into frictional contact with the retaining bolt, which secures it in the clamped condition.

The clamping slides are actuated synchronously by means of an axially actuated setting piston. An inclined surface or oblique plane is provided between the end face of the setting piston, which is designed as a ring or cylinder, and the respective clamping slides, so that the axial advance movement of the setting piston is converted into a radial advance movement for the clamping slides via the geometry of the inclined surface or oblique plane.

The disadvantage of such clamping devices has been found to be that they require very large structural dimensions, because the axial advance movements of the setting piston must be supported in the housing. In addition, the advance path of the clamping slides is extremely small, because the inclined surfaces between the setting piston and the respective clamping slides limit this movement possibility. At the same time, the frictional connection between the setting piston and the clamping slides means that the outer diameter of the housing has to be considerably enlarged in order to provide a corresponding radial movement possibility for the clamping slides. As a result, the housing of the known clamping device is constructed in such a way that both its height and its outer circumference are correspondingly large. Often, however, the available spaces or spatial conditions on machine tools are limited, so that such zero-point clamping devices cannot be used at all.

The aforementioned disadvantages should be overcome by the clamping device in accordance with DE 10 2010 010 898 A1. Such a clamping device is intended to replace the axial advance movements of a stroke piston by a rotary movement of a drive ring. For this purpose, the drive ring is arranged so that it can rotate around the receiving opening and can be turned clockwise or anti-clockwise by means of a threaded spindle. The drive ring has guide grooves worked into it, which run spirally in relation to the receiving opening. Thus, the two ends of the guide grooves are at a different distance from the centre of the receiving opening.

A cam is inserted into each guide groove, which is coupled to the respective clamping slide. The rotary movement of the drive ring thus produces radial advance movements for the three clamping slides. The arrangement of guide grooves and cams can also be reversed.

It has been found to be a disadvantage of such a clamping system that the production tolerances of the components coupled with one another in a drive system, namely the drive ring, guide grooves, cams and clamping slides, must be extremely small, as otherwise there is play, especially between guide grooves and cams, which means that the rotary motion of the drive ring is not completely transferred to the clamping slides. However, as the required production tolerances are in such a limited bandwidth for several components, the production costs are inevitably increased.

In addition, it has also been shown to be disadvantageous that the actuating forces for the required rotary movements of the drive ring cannot be controlled. This means that an excessively low actuating force results in time-consuming or protracted clamping and that increased actuating forces result in damage to the components that are coupled together in a driving arrangement, especially between the guide groove of the drive ring and the cams of the clamping slides. The actuating forces are not adjustable and therefore the actuating forces acting on the threaded spindle can cause considerable damage to the components of the clamping device.

In addition, a large number of rotations are required to move the clamping slides from the opened position to the clamping position. Such clamping or replacement processes are therefore very time-consuming and this increases production costs, because a large number of objects have to be replaced.

SUMMARY OF THE INVENTION

It is therefore the task of the present invention to further develop a zero-point clamping device of the aforementioned type in such a way that, on the one hand, it enables a reliable, permanent and repeatable fixing of a large number of workpieces, tools, pallets or other objects and, on the other hand, that the housing of the clamping device is extremely compact, i.e. its outer dimensions can be kept extremely small in height and diameter. In addition, it should be possible to replace the objects or carrier parts to be clamped without any time delay and the manually or mechanically applied actuating force should be limited by at most one revolution of the actuating element, as far as possible.

These tasks are solved according to the present invention by the features of the characterising part of patent claim 1.

Further advantageous embodiments of the present invention are derived from the subordinate claims.

By the fact that two spaced-apart threads are incorporated in the actuating element, the respective threads of which have identical pitches and are designed to be inclined in opposite directions to one another, that a drive pin is inserted in each thread, which is operatively connected to the respective thread in such a way that the drive pins can be moved along the axis of rotation of the actuating element by means of the rotation of the actuating element, that at least two drive segments are mounted floating in the housing, which extend in an arc around the centring axis of the receiving opening, that two of the drive segments are operatively coupled to the actuating element via one of the respective drive pins, that a respective pivot pin is provided between the two drive segments connected to the actuating element and the drive segment arranged adjacent thereto to form a swivel joint, and that each clamping slide is connected to one of the drive segments, a low overall height of the housing is created and the objects or carrier parts to be clamped can be replaced quickly and with a limited actuating force, since the threads incorporated in the actuating element have a predetermined pitch and their length is limited.

The design of the actuating element with two threads running in opposite directions, which have two different pitches, also means that a maximum of one rotation of the actuating element is required to transfer the three clamping slides from the starting position to the clamping position, because the first inclination is inclined in such a way that a rapid stroke is created for the clamping slides and the second inclination determines the clamping process by its profile. The dimensions of the side walls with the two different inclination profiles are adapted to the geometry of the housing and the objects or carrier parts to be clamped in such a way that the clamping slides end the rapid stroke as soon as the free ends of the clamping slides facing the object or carrier parts come into operative contact with it. Low advance forces are required for the rapid stroke and a high speed should be available for the radial advance of the clamping slides. A higher advance force is required for the clamping process, as a result of which the inclination of the side wall is designed flatter than the inclination of the side wall for the rapid stroke:

Since the actuating forces transmitted by the actuating element are converted into an axial movement of the drive pins, a superimposition of movements of the drive segments is created in an advantageous embodiment. On the one hand, these are mounted floating on a contact surface of the housing and can therefore move freely in a range determined by the housing and, on the other hand, the adjacent drive segments are connected by means of a pivot pin, which thus forms a swivel joint. As a result, there is both a rotary movement between the adjacent drive segments and a translational movement in the direction of the actuating element, in which case the three clamping slides are pressed synchronously and radially in the direction of the receiving opening. As soon as the actuating element is turned in the opposite direction, the drive segments are returned to their initial position, causing the clamping slides to move radially outwards.

The drive segments are supported exclusively by the three clamping slides, which are firmly connected to them and which in turn are held in radially running bores worked into the housing.

In addition, the drive segments run in receiving pockets, which are essentially curved in shape and are provided in the respective clamping slides. The two opposite side walls of the receiving pockets are located at two different distances from the drive segments, which prevents the clamping slides from tilting during the movement of the drive segments.

The three clamping slides fix the inserted object or carrier part in the receiving opening and the inserted objects or carrier parts are centred in relation to the centring axis of the receiving opening by the centring cone worked in the entrance area of the receiving opening. The free ends of the clamping slides facing the object or carrier part have an inclined clamping surface, which interacts with a clamping plane of the object or carrier part in the opposite direction, in such a way that the object or carrier part is pressed or drawn into the interior of the housing and the centring cone of the receiving opening comes into contact with the corresponding clamping cone of the object or carrier part. Consequently, the object or carrier part is aligned with the centring axis of the receiving opening; the axis of symmetry of the objects or carrier parts is coaxial with the centring axis of the receiving opening.

As a result of the floating mounting of the drive segments on a contact surface provided in the housing, the production tolerances for the components that are coupled together in a driving arrangement can therefore be within a larger tolerance range without the clamping effect and the movements of the clamping slides being restricted.

BRIEF DESCRIPTION OF THE DRAWINGS

The drawings show a zero-point clamping device configured in accordance with the present invention, the details of which are explained below. In the drawings.

DETAILED DESCRIPTION OF THE PREFERRED EMBODIMENTS

Figure 1:
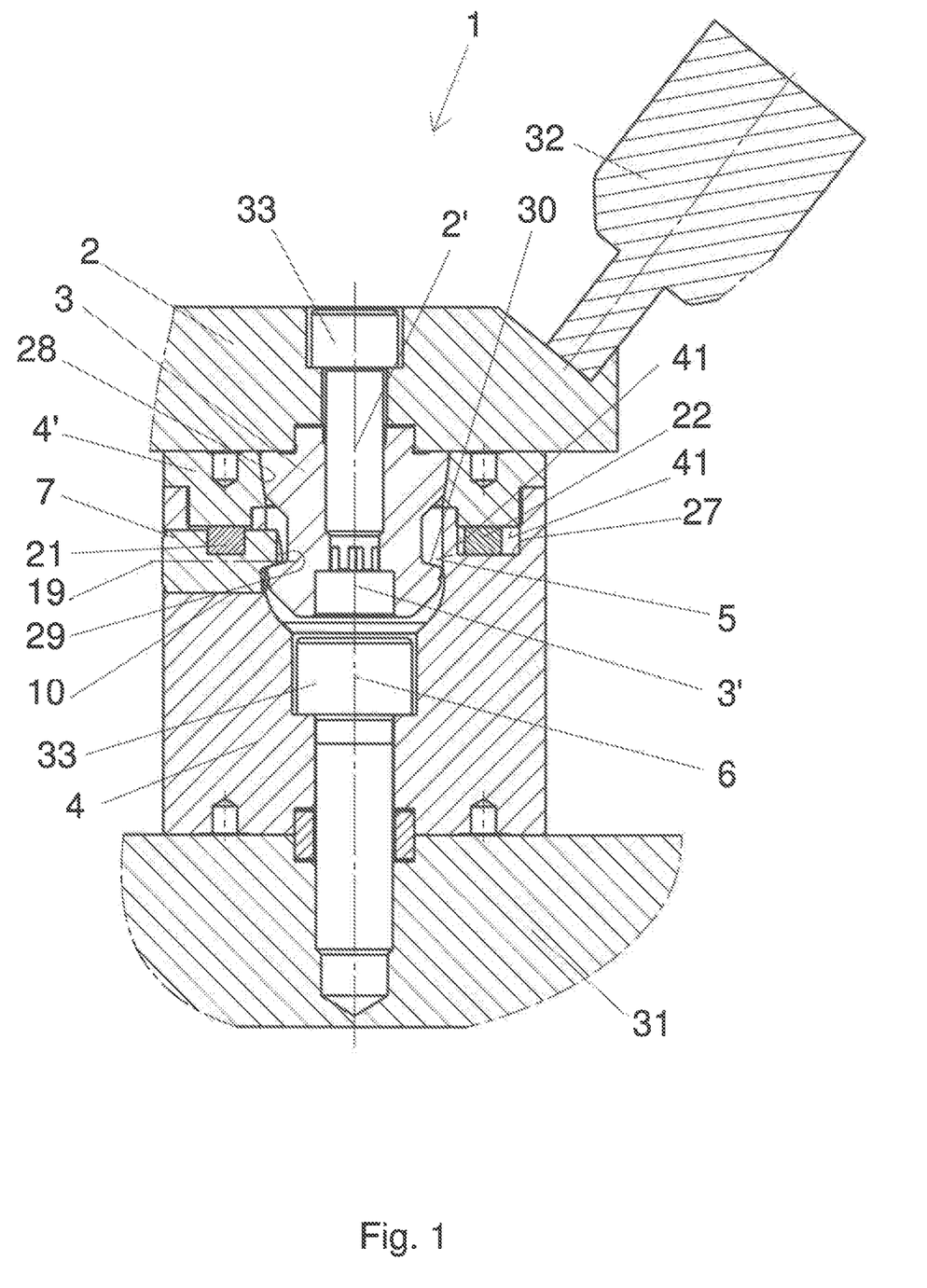
FIG. 1 shows a zero-point clamping device, consisting of a housing fixed to a machine table of a machine tool, in which a receiving opening is worked, into which a carrier part can be inserted and is centred in the receiving opening, to which an object is fixed, as a sectional view.

FIG. 1 shows a zero point clamping device 1, by means of which an object 2, to which one of the objects 2 is attached, in particular a workpiece, a tool or a pallet, or a carrier part 3, is to be centred and positioned with repeat accuracy in relation to a machine table 31 of a machine tool that is not shown. The clamping device 1 is used as a quick-change system to enable processing of identical objects 2 by means of a tool 32 without having to recalibrate the position of the object 2 after the exchange process.

It goes without saying that the object 2 can be directly connected to the clamping device 1. In the sample embodiment shown, the object 2 is locked on the carrier part 3 by means of a fixing screw 33. This structural unit is pre-assembled so that the carrier part 3 can be fixed directly on the clamping device 1—as explained in more detail below—and aligned to a reference axis.

For this purpose, the clamping device 1 consists of a housing 4 in which a receiving opening 5 is incorporated. The carrier part 3 is inserted into the receiving opening 5 and should be aligned coaxially with the centring axis 6 of the receiving opening 5 by the clamping procedure described below. The centring axis 6 is the line of symmetry of the receiving opening 5, which runs perpendicular to the machine table 31. The carrier part 3 and the object 2 also each have an axis of symmetry 2' and 3' respectively, which is aligned coaxially with the centring axis 6 when the carrier part 3 or the object 2 is clamped.

Three clamping slides 7, 8, 9 are used to fix the carrier part 3, and are mounted in an axially movable arrangement in a bore 10 worked in the housing 4. The bore 10 and the three clamping slides 7, 8, 9 run radially to the receiving opening 5. The clamping slides 7, 8, 9 open into the receiving opening 5 and can be moved into the interior of the receiving opening 5 by further advance movements, thus creating an operative contact between the clamping slides 7, 8, 9 and the carrier part 3.

Figure 2:
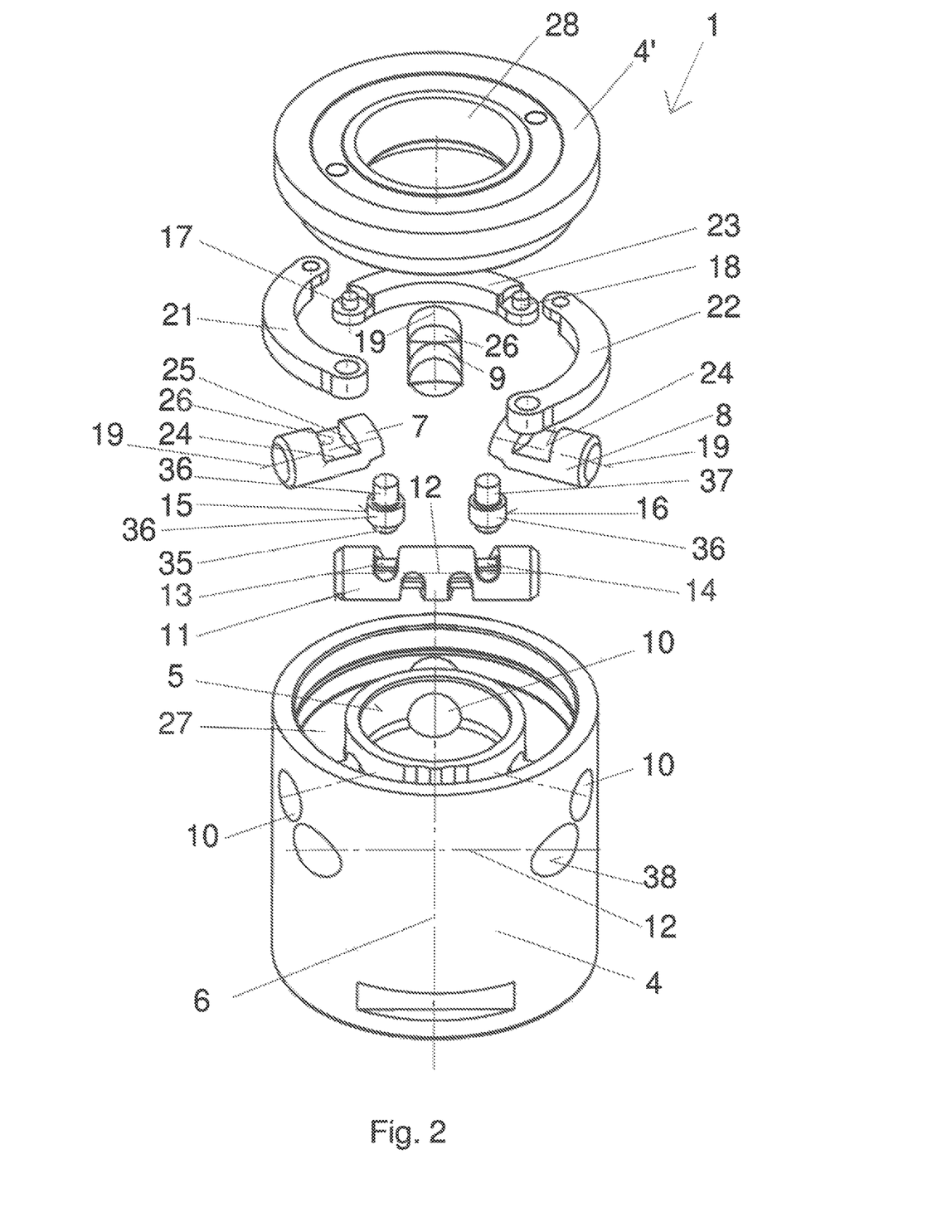
FIG. 2 shows the clamping device according to FIG. 1 in an exploded view and in a perspective view, with three clamping slides, each of which is coupled to a drive segment, and with an actuating element rotatably mounted in the housing, which is connected to two of the three drive segments via two drive pins, and with two pivot pins between each of the adjacent drive segments, to form a swivel joint.

In particular FIG. 2 shows the arrangement of all components required for the operation of the three clamping slides 7, 8, 9. For a mechanical or manual actuation of the three clamping slides 7, 8, 9, an actuating element 11 is initially provided, which is rotatably mounted in a receptacle 38 incorporated in the housing 4. The actuating element 11 has an axis of rotation 12 which runs tangentially to and at a distance from the receiving opening 5.

Two threads 13, 14 are worked into the actuating element 11 in such a way that the threads are identical and inclined in opposite directions.

One drive pin 15 or 16 each is initially connected to the actuating element 11 for transmission of the torque. The drive pins 15, 16 have three sections 35, 36 and 37 with differently sized diameters. The first section 35 is assigned to one of the threads 13 or 14 and inserted into it. The second partial section 36 projects radially outwards beyond the two adjacent partial sections 35 and 37 and is assigned to a guide groove 20 incorporated in the housing 4. The outer flanks of the partial section 36 lie linearly against the side walls of the guide grooves 20 and are thus supported by them. The partial section 37 protrudes from the housing 4 and can therefore be coupled to one of three drive segments 21 or 22.

The three drive segments 21, 22 and 23 have an identical contour or curvature and, when assembled, are arranged in a curve around the centring axis 6 or the receiving opening 5. To connect the three drive segments 21 with 23 or 22 with 23, two pivot pins 17, 18 are provided, which form a swivel joint. Consequently, the two lateral drive segments 21 and 22 are connected to the actuating element 11 via the drive pins 15 and 16 in a driving arrangement, and the free ends of the drive segments 21 and 22 opposite to these are coupled via the pivot pins 17 and 18 respectively to the drive segment 23 opposite to the actuating element 11 in the manner of a swivel joint.

The three clamping slides 7, 8, 9 have a receiving pocket 24 worked into them, in which the respective drive segment 21, 22 or 23 is inserted. The side walls 25 and 26 of the receiving pockets 24 assigned to the drive segments 21, 22, 23 are concavely curved in such a way that the distances in the area of the central axis 19 of the clamping slides 7, 8, 9 are arranged closer to one another than the two edge areas of the receiving pockets 24. This is intended to prevent tilting between the drive segments 21, 22, 23 and the clamping slides and 7, 8, 9. Accordingly, the drive segments 21, 22, 23 form a drive pair with the respective clamping slides and 7, 8, 9.

The arrangement of the clamping slides 7, 8, 9 in the bore 10 of the housing 4 ensures that the connection of the drive pairs 7 with 21, 8 with 22 and 9 with 23 is supported and held on the housing 4. The housing 4 can be closed by means of a cover 4'. Accordingly, all components can be inserted into the opened housing 4 and the cover 4' closes the installed components after assembly.

In order to enable the movement sequences of the connected pairs 7 with 21, 8 with 22 and 9 with 23, which are explained in more detail below, the drive segments 21, 22 and 23 are placed on a contact surface 27 and are therefore floating. The width of the contact surface 27 is larger in size than the width of the drive segments 21, 22 and 23, so that the drive segments 21, 22, 23 are arranged floating on the contact surface 27. Only the side walls of the housing limit the radial movement of the drive segments 21, 22, 23.

Figure 3A:
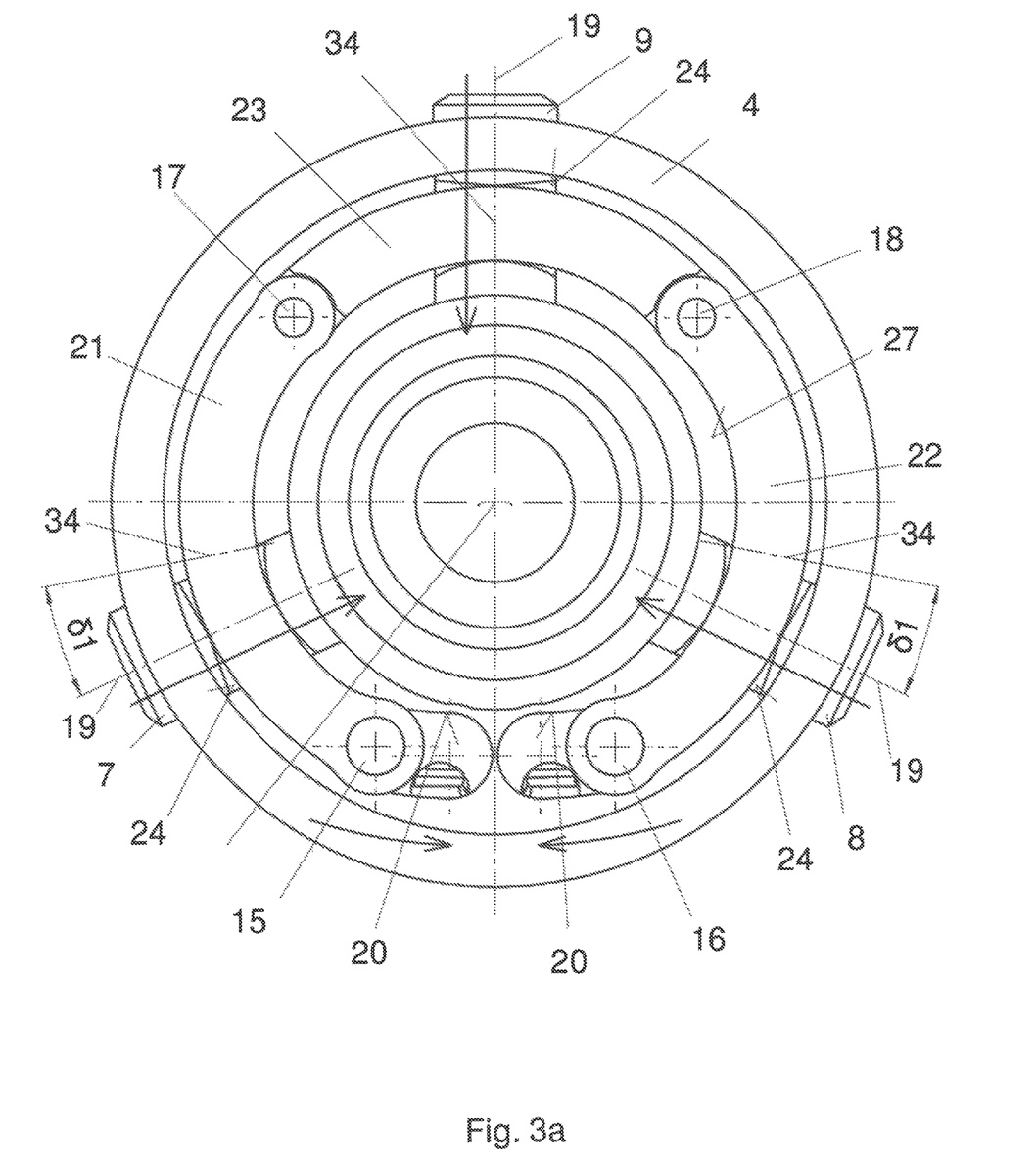
FIG. 3a shows the clamping device according to FIGS. 1 and 2, in a plan view and in the initial position.
Figure 3B:
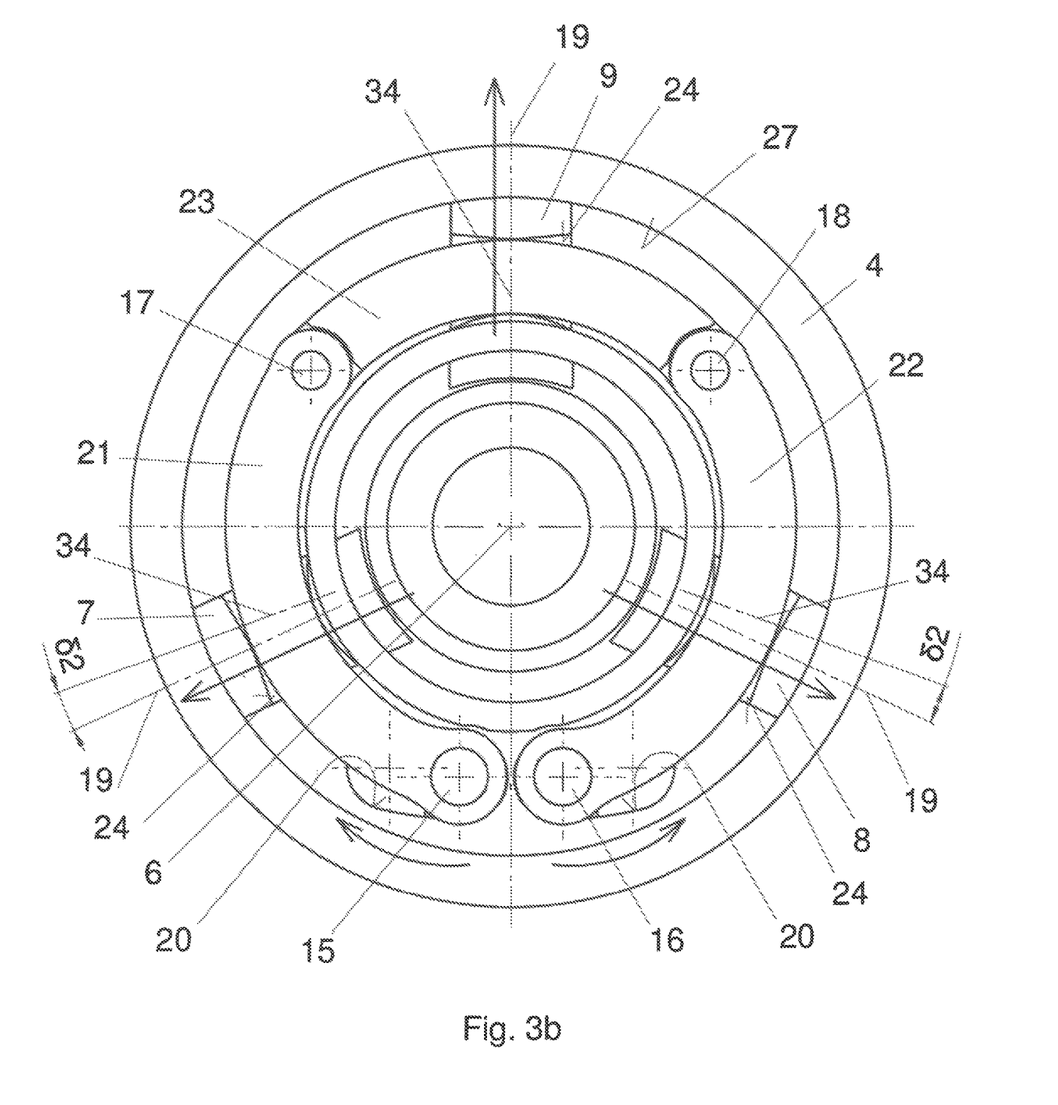
FIG. 3b shows the clamping device according to FIGS. 1 and 2, in a plan view and in the clamping position.

FIGS. 3a and 3b show the movement sequence of the clamping process and the unlocking, respectively. According to FIG. 3a, the receiving opening 5 is completely open, because the clamping slides 7, 8, 9 are aligned with the inner wall of the receiving opening 5 and thus leave it open. As a result, an object 2 or the carrier part 3 can be inserted into or removed from the receiving opening 5.

The drive pins 15 and 16 are located at the beginning of the respective thread 13 or 14 of the actuating element 11. As soon as the actuating element 11 is turned clockwise, the drive pins 15, 16 move towards one another along the axis of rotation 12 of the actuating element 11. As already explained, the second partial section 36 of the drive pins 15 and 16 is supported in the guide grooves 20 incorporated in the housing 4, so that the drive pins 15, 16 are axially aligned with one another by the rotation of the actuating element 11.

The axial advance movement of the drive pins 15 and 16 causes the drive segments 21 and 22 to be swivelled around the pivot pins 17 and 18 in the manner of a swivel joint and at the same time the pivot pins 17 and 18 are moved translationally in the direction of the actuating element 11 or the drive pins 15 and 16. As a result, the third drive segment 23 on the contact surface 27 is pulled in the direction of the receiving opening 5. The three clamping slides 7, 8, 9 are connected to the respective drive segments 21, 22 or 23 and supported in the bores 10, so consequently they are pushed radially into the interior of the receiving opening 5 and come into operative contact with the carrier part 3 or the object 2.

Figure 4:
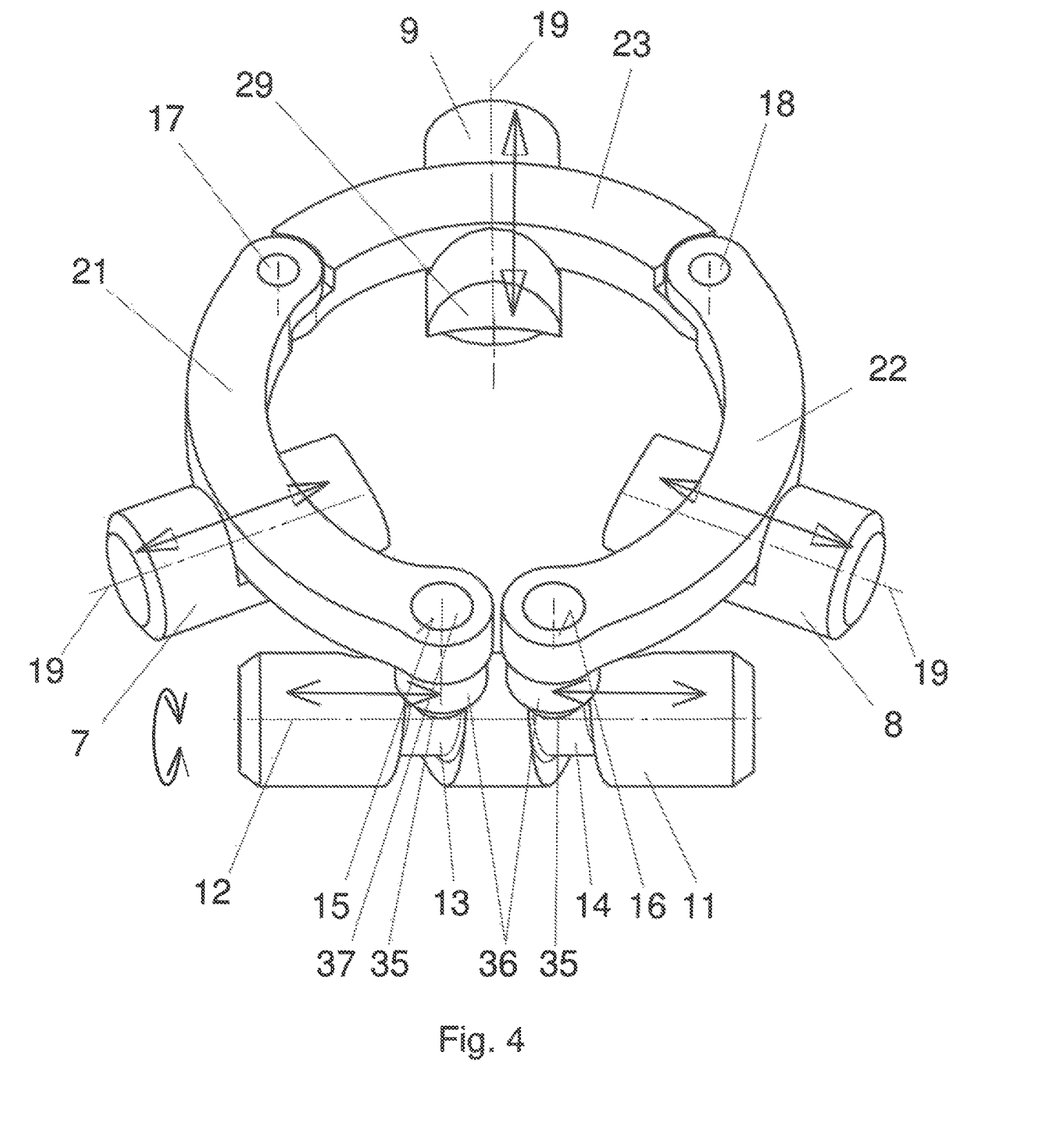
FIG. 4 shows the assembly of the drive segments and their coupling in a driving arrangement with the actuating element and the formation of a swivel joint via the pivot pins between two adjacent drive segments and with the arrangement of the clamping slides on the respective drive segments, in a perspective view according to FIG. 2.

FIG. 4 shows the movement sequence of the connected pairs 7 with 21, 8 with 22 and 9 with 23 as well as the movement sequences of the drive pins 15 and 16 due to the rotation of the actuating element 11. The curve formed by the drive segments 21, 22, 23 in their initial position is consequently reduced by the rotation of the actuating element 11, which results in the radial advance movements of the three clamping slides 7, 8, 9. This results in a transmission of two different movement sequences, namely a swivel movement around the pivot pins 17, 18 and a translatory movement of the drive segments 21, 22, 23 in the direction of the actuating element 11.

Figure 5:
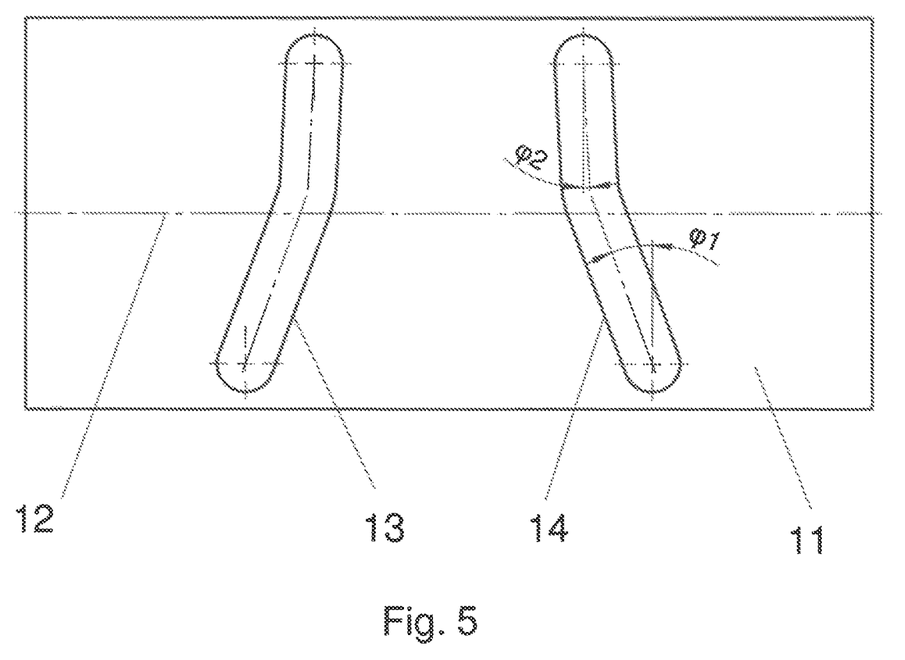
FIG. 5 shows the actuating element according to FIG. 2, as a development, with two pitches incorporated in it to form a rapid stroke and the clamping advance movement.

FIG. 5 shows that the threads 13 and 14 of the actuating element 11 have two different inclinations or pitches (φ1 and φ2) relative to the axis of rotation 12. The pitch φ1 runs flatter in relation to the axis of rotation 12 and the pitch φ2 is almost perpendicular, i.e. steeper in relation to the axis of rotation 12. This means that the advance movement of the clamping slides 7, 8, 9 takes place in a rapid stroke, because the pitch φ1 causes a low advance force combined with a high advance speed. The clamping slides 7, 8, 9 are in the initial state and are not yet in operative contact with the inserted carrier part 3 or the object 2. As soon as the clamping slides 7, 8, 9 are in operative contact with the carrier part 3 or the object 2, the clamping process should be carried out. For the clamping process, clamping device 1 requires a high advance force and a low advance speed. This is achieved by the pitch in threads 13, 14.

Figure 6:
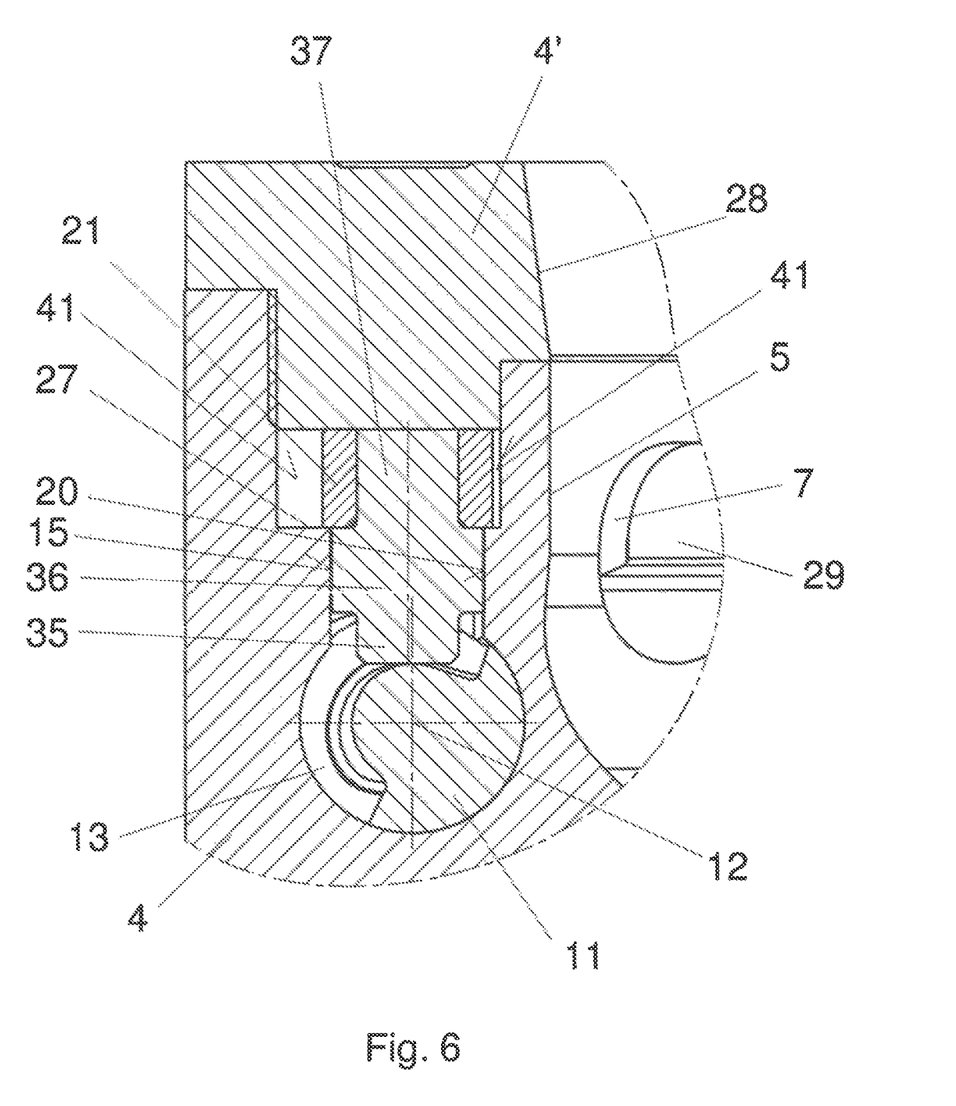
FIG. 6 shows an enlarged section of the housing according to FIG. 1, between the actuating element, the drive pin and one of the drive segments.

FIG. 6 shows the superimposition of the clamping and fixing process of the zero point clamping device 1. First of all, a centring cone 28 is worked in the entrance area of the receiving opening 5. The centring cone 28 forms a contact surface, against which the carrier part 3 is to be pressed. The outer wall of the carrier part 3 or the object 2 is adapted to the centring cone 28.

In order to achieve the contact pressure, the free ends of the clamping slides 7, 8, 9, which interact with the carrier part 3 or the object 2, each have a clamping surface 29 inclined from the horizontal. For example, clamping surface 29 is inclined at an angle of 8° to 15° to the horizontal. According to FIG. 1, a circumferential clamping plane 30 is attached to the carrier part 3, the inclination of which is adapted to and corresponds with the design of the clamping surface 29. As soon as the clamping slides 7, 8, 9 come into operative contact with the clamping plane 30 of the carrier part 3, the clamping slides 7, 8, 9 press the carrier part 3 into the interior of the receiving opening 5 according to the mechanical principle of the inclined plane; an axial movement of the carrier part 3 within the receiving opening 5 thus takes place, in which the carrier part 3 is pressed onto the centring cone 28. The radial advance movement of the clamping slides 7, 8, 9 is thus converted into an axial force component by the inclined clamping surface 29 and the clamping plane 30 of the carrier part 3, so that on the one hand the carrier part 3 is fixed in the receiving opening 5 by the clamping slides 7, 8, 9 and on the other hand the centring cone 28 causes the alignment of the carrier part 3 coaxially to the centring axis 6.

In addition, FIG. 6 shows that the partial section 35 of the drive pin 15 is inserted into the thread 13 and can be moved axially through it, and that the partial section 36 is supported laterally in the guide groove 20 of the housing 4.

In addition, the floating mounting can be observed in the area of the drive segment 21, since a corresponding air gap 41 is provided on both sides between the inner walls of the housing 4 and the outer circumference of the drive segment 21.

The figures show and explain a preferred embodiment with the clamping slides 7, 8, 9 and three drive segments 21, 22 and 23 connected to the former. However, it is technically possible to reduce the number of clamping slides 7, 8 to two or to use more than three.

Each clamping slide, regardless of its number, is connected to one of the drive segments 21, 22.

If only two clamping slides 7, 8 and two drive segments 21, 22 should be connected, then the drive segments 21, 22 are connected to one another via the drive pins 15, 16 both with the actuating element 11 and via the pivot pin 17.

What is claimed is:

1. A zero-point clamping device (1) for centered locking of an object (2) with repeat accuracy, the zero-point clamping device comprising:
   a housing (4),
   a receiving opening (5) worked into the housing (4), which has a centering axis (6) with which the axis of symmetry (2' or 3') of the object (2) or the carrier part (3) is coaxially aligned during the clamping process,
   at least two clamping slides (7, 8 or 9), each of which is mounted axially displaceably in a bore (10) provided in the housing (4) and which open into the receiving opening (5) during the clamped condition and thereby act on the object (2) or the carrier part (3) and secure the object (2) or the carrier part (3), and
   an actuating element (11) which is rotatably mounted in the housing (4) and by means of which the clamping slides (7, 8, 9) can be moved, one axis of rotation (12) of the actuating element (11) running tangentially and at a distance from the receiving opening (5),
   characterized in that,
   two spaced-apart threads (13, 14) are incorporated in the actuating element (11), the respective threads (13, 14) of which have identical pitches and are designed to be inclined in opposite directions with respect to one another,
   a drive pin (15, 16) is inserted in each thread (13, 14), this drive pin (15, 16) being in a driving operative connection with the respective thread (13 or 14) in such a way that the drive pins (15, 16) can be moved along the axis of rotation (12) of the actuating element (11) by means of the rotation of the actuating element (11),
   at least two drive segments (21, 22 or 23) are mounted in a floating arrangement in the housing (4) and extend in an arc around the centering axis (6) of the receiving opening (5), and
   two of the drive segments (21, 22) are coupled in a driving arrangement to the actuating element (11) via one of the respective drive pins (15, 16), that a respective pivot pin (17, 18) is provided between the two drive segments (21, 22) connected to the actuating element (11) and the drive segment (21, 22 or 23) arranged adjacent thereto to form a swivel joint, and that each clamping slide (7, 8, 9) is connected to one of the drive segments (21, 22, 23).

2. The clamping device according to claim 1, characterized in that,
   a U-shaped receiving pocket (24), into which the respective drive segment (21, 22, 23) is inserted, is incorporated in the respective clamping slides (7, 8, 9).

3. The clamping device according to claim 2, characterized in that,
   the side wall (25, 26) of the receiving pocket (24) facing the respective drive segment (21, 22, 23) is curved in such a way that the width of the receiving pocket (24) is smaller in size in the region of a central axis (19) of the clamping slides (7, 8, 9) than in the region of a jacket surface.

4. The clamping device according to claim 1, characterized in that,
   the two threads (13, 14) worked in the actuating element (11) have an identical length and in that the length of the thread (13, 14) defines the movement stroke of the clamping slides (7, 8, 9).

5. The clamping device according to claim 4, characterized in that, the length of the thread (13, 14) corresponds at most to one complete revolution of the actuating element (11).

6. The clamping device according to claim 1, characterized in that, the threads (13, 14) have two different inclinations (φ1, φ2) relative to the axis of rotation (12), and in that the inclination (φ1) is associated with the rapid stroke of the clamping slides (7, 8, 9) and the inclination (φ2) is associated with the clamping movement of the clamping slides (7, 8, 9).

7. The clamping device according to claim 1, characterized in that, a contact surface (27) is provided in the housing (4) for the drive segments (21, 22, 23), a width of which is greater in size than a width of the respective drive segments (21, 22, 23).

8. The clamping device according to claim 1, characterized in that, the drive segments (21, 22, 23) carry out a pivoting movement about the pivot pins (17, 18) in the direction of the actuating element (11) during the rotational movement of the actuating element (11).

9. The clamping device according to claim 1, characterized in that, the side wall of the receiving opening (5) in the entrance area has a centering cone (28), and in that the outer contour of the objects (2) or carrier parts (3) to be clamped is adapted to the centering cone (28).

10. The clamping device according to claim 9, characterized in that, a clamping surface (29) which runs at an inclination from the horizontal is provided at the respective free end of the clamping slides (7, 8, 9), in that a clamping plane (30) which interacts with the clamping surface (29) of the respective clamping slides (7, 8, 9) is provided on the object (2) to be clamped or on the carrier part (3), and in that the radial advance of the clamping slides (7, 8, 9) produces an operative contact between the clamping surfaces (29) and the clamping plane (30) in such a way that the object (2) to be clamped or the carrier part (3) is pressed into the receiving opening (5) and is pressed onto the centering cone (28) in the axial direction.

11. The clamping device according to claim 1, characterized in that, the clamping slides (7, 8, 9) are spaced apart from one another at an identical pitch angle which corresponds to 120°.

12. The clamping device according claim 1, characterized in that, the clamping slides (7, 8, 9) have a central axis (19) and in that the axis of symmetry (34) of the respective drive segment (21, 22, 23) is arranged in a central region of the central axis (19) and, during an advance movement, the clamping slide (7, 8, 9) is displaced by a distance (Δ1, Δ2) relative to the central axis (19).

13. The clamping device according to claim 1, characterized in that, the clamping slides (7, 8, 9) are held in the bore (10) in an axially guided manner, and in that the connection between the respective pairs of clamping slides (7, 8, 9) and drive segments (21, 22, 23) is held in the respective bores (10) in a position-oriented manner.

14. The clamping device according to claim 1, characterized in that, the drive pins (15, 16) have three partial sections (35, 36, 37) with diameters of different sizes, in that the first partial section (35) is inserted into the thread (13 or 14) of the actuating element (11), in that the second partial section (35) projects outwards or beyond the other two partial sections adjacent to the second partial section and is mounted axially displaceably in a guide groove (20) incorporated in the housing (4), and in that the third section (36) is connected to the respective drive segment (21 or 22).

\* \* \* \* \*